US012606437B2

(12) United States Patent
Qin et al.

(10) Patent No.: US 12,606,437 B2
(45) Date of Patent: Apr. 21, 2026

(54) PREPARATION METHOD AND APPLICATION OF IRON PHOSPHATE

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Cunpeng Qin, Foshan (CN); Ji Wei, Foshan (CN); Genghao Liu, Foshan (CN); Dingshan Ruan, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 468 days.

(21) Appl. No.: 18/210,223

(22) Filed: Jun. 15, 2023

(65) Prior Publication Data

US 2023/0322558 A1 Oct. 12, 2023

Related U.S. Application Data

(63) Continuation of application No. PCT/CN2021/123724, filed on Oct. 14, 2021.

(30) Foreign Application Priority Data

Dec. 15, 2020 (CN) .......................... 202011471547.1

(51) Int. Cl.
*C01B 25/37* (2006.01)
*C01B 25/45* (2006.01)
(Continued)

(52) U.S. Cl.
CPC .......... *C01B 25/375* (2013.01); *C01B 25/451* (2013.01); *H01M 4/5825* (2013.01);
(Continued)

(58) Field of Classification Search
None
See application file for complete search history.

(56) References Cited

U.S. PATENT DOCUMENTS

2023/0050044 A1* 2/2023 Liu ....................... H01M 10/54

FOREIGN PATENT DOCUMENTS

CN 102881960 A 1/2013
CN 103825024 A 5/2014
(Continued)

OTHER PUBLICATIONS

Derwent Abstract of CN 111333049 A, Y. Jiang, Preparation Of Lithium Iron Manganese Phosphate Involves Using Waste Lithium Iron Phosphate Material, published Jun. 6, 2020 (Year: 2020).*
(Continued)

*Primary Examiner* — John J Figueroa
(74) *Attorney, Agent, or Firm* — Westbridge IP LLC

(57) ABSTRACT

Disclosed are a preparation method and application of iron phosphate. The preparation method comprises: subjecting iron phosphate waste to calcination, dissolving it in an acid solution, and filtering to obtain filtrate, namely a solution A containing iron phosphorus; stirring a mixed solution of the solution A and a first alkali solution, adjusting pH of the mixed solution to acidity for reaction, and after washing and filtering to obtain second filter residue, namely an amorphous yellow iron phosphate filter cake; subjecting the
(Continued)

yellow iron phosphate filter cake to aging and heating, adding phosphoric acid and a second alkali solution for reaction, followed by washing and filtering to obtain third filter residue, namely a basic ammonium iron phosphate filter cake, then drying to obtain basic ammonium iron phosphate crystal powder; and subjecting the basic ammonium iron phosphate crystal powder to calcination for dehydration and cooling to obtain iron phosphate.

6 Claims, 2 Drawing Sheets

(51) Int. Cl.
   *H01M 4/02*          (2006.01)
   *H01M 4/58*          (2010.01)
(52) U.S. Cl.
   CPC ...... *C01P 2002/72* (2013.01); *C01P 2004/03* (2013.01); *C01P 2004/61* (2013.01); *C01P 2006/11* (2013.01); *C01P 2006/12* (2013.01);

*C01P 2006/40* (2013.01); *H01M 2004/021* (2013.01); *H01M 2004/028* (2013.01)

(56)                References Cited

FOREIGN PATENT DOCUMENTS

| | | | | |
|---|---|---|---|---|
| CN | 110482514 A | 11/2019 | | |
| CN | 110683528 A | 1/2020 | | |
| CN | 111115605 A | 5/2020 | | |
| CN | 111333049 A | * 6/2020 | ............. | C01B 32/15 |

OTHER PUBLICATIONS

International Search Report of PCT Patent Application No. PCT/CN2021/123724 issued on Dec. 24, 2021.

* cited by examiner

PREPARATION METHOD AND APPLICATION OF IRON PHOSPHATE

CROSS-REFERENCE TO RELATED APPLICATIONS

The present application is a continuation application of PCT application No. PCT/CN2021/123724 filed on Oct. 14, 2021, which claims the benefit of Chinese Patent Application No. 202011471547.1 filed on Dec. 15, 2020. The contents of all of the aforementioned applications are incorporated by reference herein in their entirety.

TECHNICAL FIELD

The present disclosure relates to the field of battery materials, and in particular to a preparation method and application of iron phosphate.

BACKGROUND

With strong support from the state in the field of new energy vehicles and increasing public awareness of environmental protection in China, lithium ion batteries have gradually become a widely used power storage device. Lithium iron phosphate batteries have gradually become the first choice in the field of rechargeable batteries for new energy vehicles due to their advantages of good safety, long cycle life and low price. In addition, since lithium iron phosphate batteries do not contain precious metals and rare elements, have abundant raw material reserves and do not cause damage to the environment, they are gradually showing new vitality. At present, lithium iron phosphate batteries are produced as mainstream energy storage batteries by many new energy battery companies.

Iron phosphate is an important precursor material in the production of cathode materials for lithium iron phosphate batteries, and its quality will directly affect the performance of lithium iron phosphate batteries. It is recorded in the prior art that iron phosphate is produced by using a ferrous salt as an iron source and oxidizing divalent iron to trivalent iron with hydrogen peroxide as an oxidant. In this method, more expensive hydrogen peroxide is consumed as an oxidant, which increases the production cost. A method for preparing high-density basic ammonium iron phosphate is also disclosed in the prior art. In this method, due to the presence of divalent iron in the raw material, a large amount of hydrogen peroxide is also consumed as an oxidant to oxidize the divalent iron to trivalent iron. In addition, although the produced basic ammonium iron phosphate has relatively high tap density up to 1.3-1.6 g/cm$^3$, its particle size D50 is large, which makes crushing difficult, so that there are certain disadvantages for the preparation lithium iron phosphate with high performance.

At present, there is no report on the preparation of battery-grade iron phosphate by using a trivalent iron source to prepare basic ammonium iron phosphate with a controllable and smaller particle size.

SUMMARY

An objective of the present disclosure is to provide a preparation method and application of iron phosphate so as to solve the shortcomings in the prior art. The iron phosphate prepared by the preparation method has a small particle size, uniform particle size distribution, high tap density and controllable morphology, so that it can be used as a precursor material for high-performance lithium iron phosphate.

In order to achieve the aforementioned objective, the following technical solution is adopted in the present disclosure.

A preparation method of iron phosphate comprises steps of:

Step (1): subjecting iron phosphate waste to calcination to obtain calcinated waste, dissolving the calcinated waste in an acid solution, and filtering a resulting solution to obtain filtrate, the filtrate being a solution A containing iron and phosphorus elements;

Step (2): stirring a mixed solution of the solution A obtained in step (1) and a first alkali solution, adjusting pH of the mixed solution to acidity for reaction, and after washing and filtering to obtain second filter residue, the second filter residue being an amorphous yellow iron phosphate filter cake;

Step (3): subjecting the yellow iron phosphate filter cake to aging, slurrying and heating, adding orthophosphoric acid and a second alkali solution thereto for reaction, followed by washing and filtering to obtain third filter residue, the third filter residue being a basic ammonium iron phosphate filter cake, then drying the basic ammonium iron phosphate filter cake to obtain basic ammonium iron phosphate crystal powder; and Step (4): subjecting the basic ammonium iron phosphate crystal powder to calcination for dehydration and cooling to obtain the iron phosphate.

In some embodiments, in step (1), the iron phosphate waste is at least one selected from a group consisting of anhydrous iron phosphate and iron phosphate dihydrate.

In some embodiments, in step (1), the calcination is carried out for 1 hour to 5 hours at a temperature in a range from 250° C. to 450° C. The calcination is carried out to transform iron phosphate in the iron phosphate waste to anhydrous iron phosphate which is soluble in dilute sulfuric acid.

In some embodiments, in step (1), the acid solution is one selected from a group consisting of sulfuric acid, hydrochloric acid, and orthophosphoric acid.

In some embodiments, when the acid solution is the sulfuric acid, the sulfuric acid has a concentration in a range from 1 mol/L to 3 mol/L. In some other embodiments, the sulfuric acid has a concentration in a range from 1.5 mol/L to 3 mol/L.

In some embodiments, a molar ratio of $SO_4^{2-}$ of the sulfuric acid to $Fe^{3+}$ of the iron phosphate waste is (1.3-1.8):1.

In some embodiments, in step (1), the dissolution is carried out for 3 hours to 10 hours at a temperature in a range from 25° C. to 60° C. Dissolution at a temperature in a range from 25° C. to 60° C. is related to calcination. Iron phosphate dihydrate is insoluble in an acid solution, and crystal water in the iron phosphate waste is removed through calcination to form anhydrous iron phosphate which is soluble in dilute sulfuric acid.

In some embodiments, in step (1), a molar ratio of Fe to P in the solution A is 1:(0.90-1.05).

In some embodiments, in step (1), detecting a ratio of iron to phosphorus in the solution A containing iron and phosphorus elements is further comprised. If the ratio of Fe to P is 1:(0.90-1.05), a solution of iron salt or phosphate is not added. If the ratio of Fe to P is less than 1:0.90 or greater than 1:1.05, it is necessary to add a solution of iron salt or phosphate.

In some other embodiments, the phosphate added is one or more selected from a group consisting of diammonium hydrogen phosphate, ammonium dihydrogen phosphate, ammonium phosphate, dipotassium hydrogen phosphate, potassium dihydrogen phosphate, potassium phosphate, disodium hydrogen phosphate, sodium dihydrogen phosphate, and sodium phosphate; and the solution of phosphate has a concentration in a range from 0.2 mol/L to 1.5 mol/L.

In some other embodiments, the iron salt added is one or more selected from a group consisting of anhydrides and hydrates of iron sulfate, iron nitrate, and iron chloride; and the solution of iron salt has a concentration in a range from 0.2 mol/L-1.5 mol/L.

In some embodiments, the first alkali solution in step (2) and the second alkali solution in step (3) are each independently at least one selected from a group consisting of solutions of ammonia, urea, ammonium chloride and ammonium bicarbonate.

In some embodiments, in step (2), a dosage ratio of the solution A containing iron and phosphorus elements to the first alkali solution is (10-3): 1. According to the embodiments of the present disclosure, the dosage ratio of the solution A to the first alkali solution within a certain range can reduce the pH fluctuation range of the system, will not cause pH to rise and fall due to different concentrations, and will not cause pH to be too low or too high. Too high pH will easily render that $Fe(OH)_3$ is produced, and too low pH will easily cause incomplete precipitation. Therefore, the dosage ratio of the solution A to the first alkali solution within a certain range will cause high product stability from batch to batch.

In some other embodiments, the first alkali solution and the second alkali solution each independently have a concentration of 10 wt %-30 wt %.

In some embodiments, in step (2), the adjusting pH of the mixed solution means that the pH of the mixed solution is adjusted to a range of 1.5-2.5.

In some embodiments, in step (2), the reaction is carried out for 0.1 to 0.5 hour at a temperature in a range from 30° C. to 50° C.

In some embodiments, in step (2), the stirring is carried out at a stirring speed in a range from 200 rpm to 500 rpm.

In some embodiments, in step (2), the washing is carried out until a conductivity is in a range from 2000 μs/cm to 5000 μs/cm.

In some embodiments, in step (3), the heating is carried out at a temperature in a range from 80° C. to 100° C., and the stirring is carried out at a stirring speed in a range from 100 rpm to 200 rpm.

In some embodiments, in step (3), slurry and clear liquid are generated during the reaction, the reaction is carried out until a Fe content in the clear liquid is less than 20 mg/L, and a solid content is controlled to be in a range from 50 g/L-200 g/L during the reaction.

In some embodiments, in step (3), the orthophosphoric acid has a mass concentration of 80%-90%.

In some embodiments, in step (3), the addition of orthophosphoric acid and the second alkali solution adjusts pH to a range of 1.5-4.5.

In some embodiments, in step (3), after the orthophosphoric acid is added, a molar ratio of total iron to total phosphorus in the system is 1:(1.1-1.4).

In some embodiments, in step (3), the washing is carried out until a conductivity is in a range from 2000 μs/cm to 5000 μs/cm.

In some embodiments, in step (3), the aging is carried out for 0.5 hour to 10 hours at a temperature of 50° C. to 100° C. under a stirring speed of 100 to 500 rpm.

In some embodiments, in step (3), the alkali solution is at least one selected from a group consisting of solutions of ammonia, urea, ammonium chloride and ammonium bicarbonate In some embodiments, in step (3), the basic ammonium iron phosphate has a formula of $NH_4Fe_2(OH)(PO_4)_2 \cdot 2H_2O$, and contains two crystal water. The basic ammonium iron phosphate has D50 of 1.5 μm-10 μm, tap density of 0.70 g/cm³-1.3 g/cm³, and specific surface area of 40 m²/g-60 m²/g. In addition, the contents of Fe and P are close to that of iron orthophosphate dihydrate, $FePO_4 \cdot 2H_2O$. The basic ammonium iron phosphate releases $NH_3$ and $H_2O$ during calcination to become anhydrous $FePO_4$.

In some embodiments, in step (3), the drying is carried out for 12 hours to 24 hours at a temperature in a range from 100° C. to 180° C.

In some embodiments, in step (4), the calcination for dehydration is two-stage calcination for dehydration. The first stage of calcination for dehydration is carried out for 3 hours to 5 hours at a temperature of 250° C. to 350° C. at a heating rate of 2 to 5° C./min, and the second stage of calcination for dehydration is carried out for 5 hours to 7 hours at a temperature of 500° C. to 600° C. at a heating rate of 5 to 10° C./min.

Iron phosphate prepared through the aforementioned preparation method has D50 of 1 μm-10 μm, tap density of 0.80 g/cm³-1.30 g/cm³, and specific surface area of 5 m²/g-10 m²/g.

Use of the aforementioned iron phosphate in preparation of batteries is also provided in the present disclosure.

Beneficial Effects (1) In the present disclosure, recovered iron phosphate waste is used as a raw material, an alkali solution is used to precipitate amorphous iron phosphate, and another alkali solution (ammonia water) and orthophosphoric acid are used as aging agents under conditions of stirring and high temperature, so that controllable crystallization of basic ammonium iron phosphate is achieved. The preparation method of the present disclosure can not only greatly improve controllability of the crystallization of ammonium iron phosphate, but also only require simple equipment and easy operation. In addition, the preparation method is an effective way to prepare large quantities of qualified battery-grade iron phosphate due to its advantages of low raw material cost, stable product performance from batch to batch, short aging time, and greatly improved production efficiency.

(2) The basic ammonium iron phosphate which is prepared through an aging process produces anhydrous iron phosphate with stable performance after calcination at a high temperature, has controllable morphology, high tap density, low impurity contents, smaller particle size and uniform particle size distribution, which provides basis for subsequent preparation of high-performance lithium iron phosphate cathode materials.

(3) The raw material iron phosphate waste used in the present disclosure is unqualified iron phosphate produced or recovered from waste lithium iron phosphate batteries, iron phosphate dihydrate waste or a mixture of them, and is a kind of recyclable iron-phosphorus compound, which can effectively reduce the environmental hazards of waste lithium iron phosphate batteries and raw material cost, thereby having considerable economic benefits and conforming to the basic national policy of environmental protection in China. In addition, iron phosphate waste is dissolved in dilute sulfuric acid to obtain a solution containing certain concentrations of iron and phosphorus, and the concentrations of iron and phosphorus in the solution are controlled so that the consistency of the iron to phosphorus ratio of different batches can be maintained, which can solve the problem of poor consistency of the iron to phosphorus ratio of different batches, keep the product performance stable, and ensure product stability from batch to batch.

(4) The iron phosphate prepared by this method has small particles with a particle size D50 of 1 to 10 $\mu$m, uniform morphology of secondary particles, high tap density, and high crystallinity, so that it is suitable for preparing lithium iron phosphate batteries.

DETAILED DESCRIPTION

Figure 1:
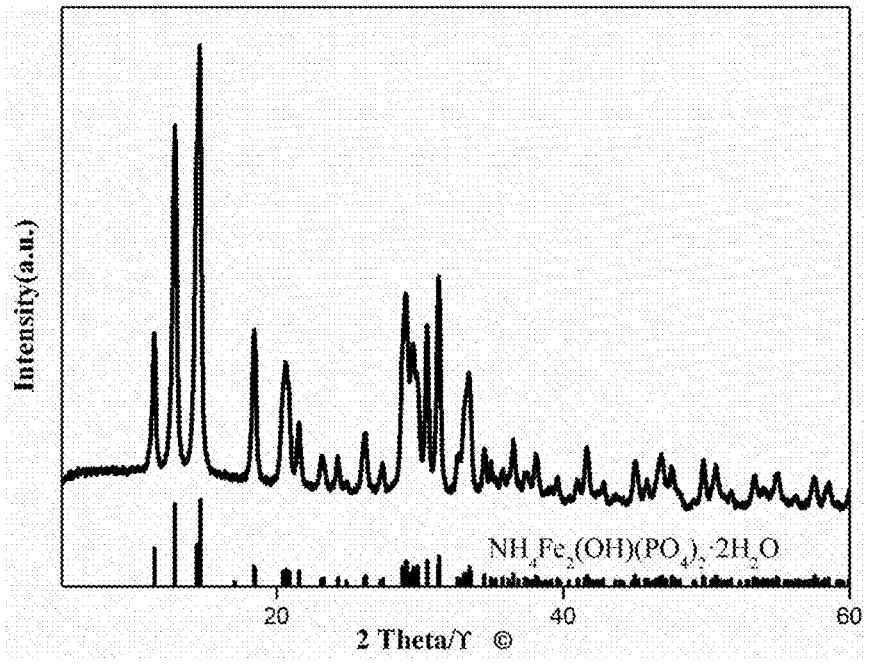
FIG. 1 is an XRD pattern of basic ammonium iron phosphate prepared in Example 1 of the present disclosure.

In order to provide thorough understanding of the present disclosure, the preferred embodiments will be described below in conjunction with examples to further illustrate the features and advantages of the present disclosure. Any variations or modifications that do not deviate from the concept of the present disclosure can be understood by those skilled in the art, and the scope of protection of the present disclosure is determined by the scope of the claims.

Where specific conditions are not indicated in the examples of the present disclosure, they are conventional conditions or the conditions recommended by manufacturers. The raw materials, reagents, etc. used without an indication of the manufacturer are all conventional products that can be purchased commercially.

Example 1

A preparation method of iron phosphate in this example comprises steps of:

(1) Subjecting 50 kg iron phosphate dihydrate waste to calcination at 350° C. for 3 hours to remove crystal water so as to obtain about 40 kg calcinated material;

adding the calcainted material into a kettle containing 270 L of a 1.5 mol/L sulfuric acid solution and stirring at a rotational speed of 200 rpm, heating up the kettle to 50° C. for about 5 hours to dissolve the calcainted material, standing prior to filtering out filter residue with a precision filter and transferring the resulting filtrate to a storage tank to obtain a solution containing $Fe^{3+}$ and $PO_4^{3-}$, with an iron content of 43.28 g/L and a phosphorus content of 24.78 g/L, and a molar ratio of Fe:P of 1:1.03;

(2) With 50 L deionized water as bottom liquid, injecting the solution containing $Fe^{3+}$ and $PO_4^{3-}$ and ammonia water into a reaction kettle from a bottom at a feed rate ratio of the solution containing $Fe^{3+}$ and $PO_4^{3-}$ to ammonia water of 6:1 in parallel, finely adjusting the feed rate of ammonia water according to a pH real-time feedback system to adjust pH=2 so as to precipitate amorphous iron phosphate, performing reaction at 30° C. for 0.5 hour prior to solid-liquid separation, testing contents of residual Fe and P in the supernatant as 10 mg/L and 153 mg/L respectively (which indicates that Fe ions have been almost completely precipitated), and washing the reaction solution with water to a conductivity of 3500 $\mu$s/cm to obtain a yellow amorphous iron phosphate filter cake;

(3) Putting the amorphous iron phosphate filter cake into an aging kettle, thoroughly stirring the amorphous iron phosphate filter cake for 2 hours to obtain a slurry at a stirring speed of 300 rpm with a solid content of the slurry controlled to 100 g/L, heating up the aging kettle to 95° C., pumping in parallel 2 L orthophosphoric acid (85 wt. %) and 5 L ammonia water (15 wt. %) into the slurry in the aging kettle with a peristaltic pump, aging for 5 hours at a certain stirring speed with pH of 2, then subjecting the aged slurry to washing with water to a conductivity of 400 $\mu$s/cm and solid-liquid separation to obtain a basic ammonium iron phosphate ($NH_4Fe_2$ $(OH)(PO_4)_2 \cdot 2H_2O$) filter cake, followed by drying the filter cake at 180° C. for about 15 hours to obtain basic ammonium iron phosphate crystal powder, and testing the ammonium iron phosphate crystal powder for basic performance; and (4) Heating up the dried basic ammonium iron phosphate crystal powder in a muffle furnace to 350° C. for 3 hours at a heating rate of 5° C./min, then to 550° C. for 6 hours at a heating rate of 10° C./min, followed by naturally cooling down to room temperature to obtain 3.85 kg qualified battery-grade iron phosphate $FePO_4$ with a yield greater than 96%, and finally testing and analyzing the resulting product for phase and performance.

The physical and chemical performance indexes of basic ammonium iron phosphate and iron phosphate obtained in this example are shown in Table 1:

TABLE 1

| Basic ammonium iron phosphate | Fe (wt %) | P (wt %) | Fe/P | D10 ($\mu$m) | D50 ($\mu$m) | D90 ($\mu$m) | (D90-D10)/D50 |
|---|---|---|---|---|---|---|---|
| | 29.49 | 17.02 | 0.961 | 0.99 | 3.51 | 9.30 | 2.37 |
| | BET ($m^2$/g) | TD (g/cc) | Ni (wt %) | Co (wt %) | Mn (wt %) | Ca (wt %) | Mg (wt %) |
| | 44.0 | 0.73 | 0.0001 | 0.0001 | 0.057 | 0.0001 | 0.0001 |
| | Na (wt %) | Cu (wt %) | Zn (wt %) | S (wt %) | Al (wt %) | Ti (wt %) | Mo (wt %) |
| | 0.0005 | 0.0010 | 0.0001 | 0.0211 | 0.0023 | 0.0085 | 0.0001 |

TABLE 1-continued

| Iron phosphate | Fe (wt %) | P (wt %) | Fe/P | D10 (µm) | D50 (µm) | D90 (µm) | (D90-D10)/D50 |
|---|---|---|---|---|---|---|---|
| | 36.34 | 20.82 | 0.968 | 0.88 | 3.77 | 13.19 | 3.27 |
| | BET (m$^2$/g) | TD (g/cc) | Ni (wt %) | Co (wt %) | Mn (wt %) | Ca (wt %) | Mg (wt %) |
| | 10.1 | 1.00 | 0.0001 | 0.0001 | 0.0121 | 0.0001 | 0.0001 |
| | Na (wt %) | Cu (wt %) | Zn (wt %) | S (wt %) | Al (wt %) | Ti (wt %) | Mo (wt %) |
| | 0.0008 | 0.0012 | 0.0001 | 0.089 | 0.0021 | 0.0050 | 0.0001 |

Figure 2:
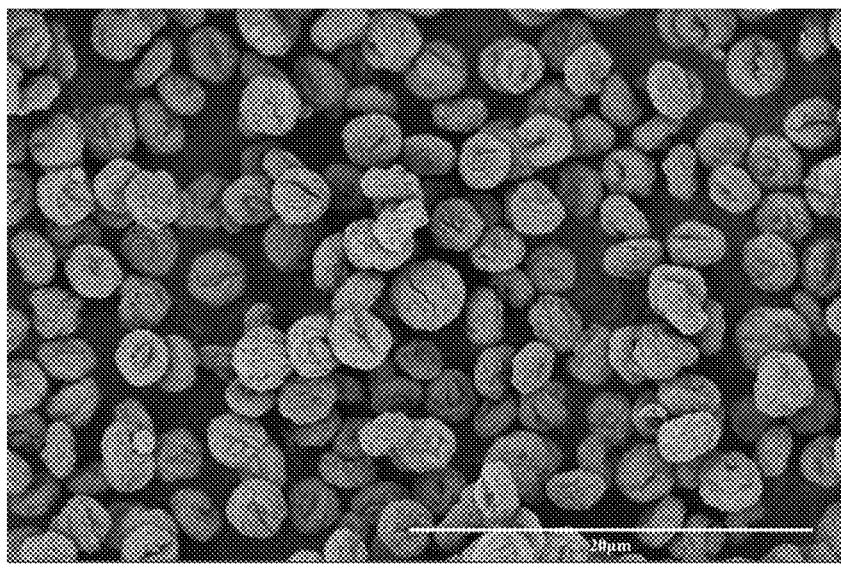
FIG. 2 is an SEM image of basic ammonium iron phosphate prepared in Example 1 of the present disclosure.
Figure 3:
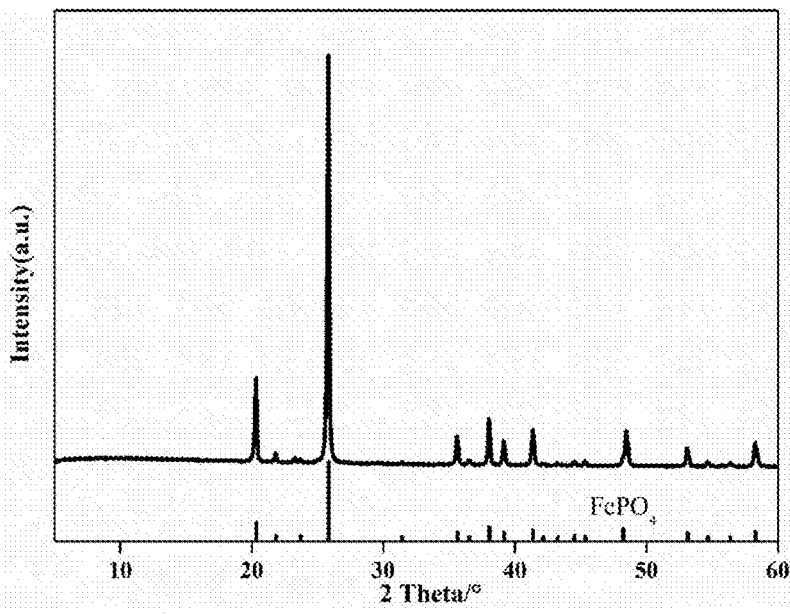
FIG. 3 is an XRD pattern of iron phosphate prepared in Example 1 of the present disclosure.
Figure 4:
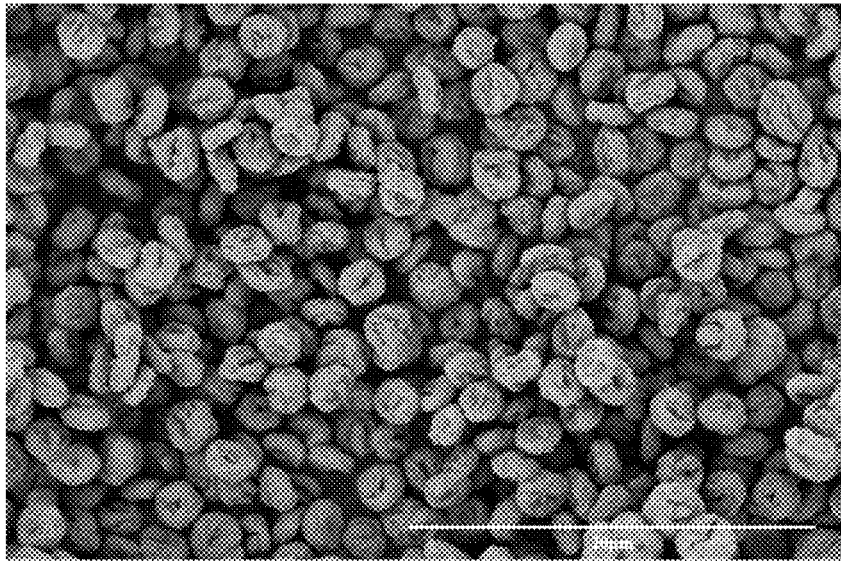
FIG. 4 is an SEM image of iron phosphate prepared in Example 1 of the present disclosure.

FIGS. 1 and 2 are respectively an XRD pattern and an SEM image of basic ammonium iron phosphate prepared in Example 1, FIGS. 3 and 4 are respectively an XRD pattern and an SEM image of iron phosphate prepared in Example 1; and Table 1 shows the physical and chemical indexes of basic ammonium iron phosphate and iron phosphate prepared in Example 1. It can be seen from FIG. 1 that the basic ammonium iron phosphate prepared in Example 1 has relatively high phase purity and good crystallinity, and no other impurity phases are found. It can be seen from FIG. 2 that primary particles of the basic ammonium iron phosphate have a relatively large length-diameter ratio, and secondary particles have a nest-like spherical structure with good particle dispersion. It can be seen from FIG. 3 that the iron phosphate prepared in Example 1 has very good crystallinity and no other impurity phases are found. It can be seen from FIG. 4 that secondary particles of the prepared iron phosphate still have nest-like spherical structure, and the change is small before and after annealing; annealing only causes the primary particles to melt, the particle size is slightly larger and the specific surface area is reduced, so that the particle dispersion is still relatively good. Table 1 shows that the basic ammonium iron phosphate and iron phosphate of Example 1 have contents of iron and phosphorus as well as various other elements that meet the Chinese national standards for anhydrous iron phosphate, and have small dispersion of particle size distribution, narrow particle size distribution; in addition, the particle size distribution after calcination is wider than that before calcination, both tap densities before and after calcination are relatively high, and specific surface area is moderate. Therefore, the basic ammonium iron phosphate and iron phosphate of Example 1 are suitable as precursor materials for preparing lithium iron phosphate batteries.

Example 2

A preparation method of iron phosphate in this example comprises steps of:
(1) Subjecting 10 kg iron phosphate waste to calcination at 400° C. for 5 hours to remove crystal water so as to obtain about 8 kg calcinated material; adding the calcainted material into a kettle containing 34 L of a 2.4 mol/L sulfuric acid solution and stirring at a rotational speed of 200 rpm, heating up the kettle to 50° C. for about 5 hours to dissolve the calcainted material, standing prior to filtering out filter residue with a precision filter and transferring the resulting filtrate to a storage tank to obtain a solution containing $Fe^{3+}$ and $PO_4^{3-}$, with an iron content of 83.20 g/L and a phosphorus content of 47.9 g/L, and a molar ratio of Fe:P of 1:1.04;
(2) With 50 L deionized water as bottom liquid, injecting the solution containing $Fe^{3+}$ and $PO_4^{3-}$ and ammonia water into a reaction kettle from a bottom at a feed rate ratio of the solution containing $Fe^{3+}$ and $PO_4^{3-}$ to ammonia water of 3:1 in parallel, finely adjusting the feed rate of ammonia water according to a pH real-time feedback system to adjust pH=2.5 so as to precipitate amorphous iron phosphate, performing reaction at 50° C. for 0.5 hour prior to solid-liquid separation, testing contents of residual Fe and P in the supernatant as 19 mg/L and 230 mg/L respectively (which indicates that Fe ions have been almost completely precipitated), and washing the reaction solution with water to a conductivity of 4500 µs/cm to obtain a yellow amorphous iron phosphate filter cake;
(3) Putting the amorphous iron phosphate filter cake into an aging kettle, thoroughly stirring the amorphous iron phosphate filter cake for 2 hours to obtain a slurry at a stirring speed of 300 rpm with a solid content of the slurry controlled to 200 g/L, heating up the aging kettle to 95° C., pumping in parallel 1.5 L orthophosphoric acid (85 wt. %) and 4 L ammonia water (25 wt. %) into the slurry in the aging kettle with a peristaltic pump, aging for 8 hours at a certain stirring speed with pH of 2.5, then subjecting the aged slurry to washing with water to a conductivity of 300 µs/cm and solid-liquid separation to obtain a basic ammonium iron phosphate $(NH_4Fe_2(OH)(PO_4)_2 \cdot 2H_2O)$ filter cake, followed by drying the filter cake at 150° C. for about 20 hours to obtain basic ammonium iron phosphate crystal powder, and testing a certain amount of ammonium iron phosphate for basic performance; and
(4) Heating up the dried basic ammonium iron phosphate crystal powder in a muffle furnace to 300° C. for 4 hours at a heating rate of 3° C./min, then to 500° C. for 7 hours at a heating rate of 5° C./min, followed by naturally cooling down to room temperature to obtain 7.8 kg qualified battery-grade iron phosphate $FePO_4$ with a yield greater than 97%, and finally testing and analyzing the resulting product for phase and performance.

The physical and chemical performance indexes of basic ammonium iron phosphate and iron phosphate obtained in this example are shown in Table 2:

TABLE 2

| Basic ammonium iron phosphate | Fe (wt %) | P (wt %) | Fe/P | D10 (µm) | D50 (µm) | D90 (µm) | (D90-D10)/D50 |
|---|---|---|---|---|---|---|---|
| | 29.12 | 16.58 | 0.974 | 1.53 | 6.72 | 11.65 | 1.80 |
| | BET | TD | Ni | Co | Mn | Ca | Mg |

TABLE 2-continued

| | (m²/g) | (g/cc) | (wt %) | (wt %) | (wt %) | (wt %) | (wt %) |
|---|---|---|---|---|---|---|---|
| | 40.5 | 0.92 | 0.0001 | 0.0012 | 0.0049 | 0.0005 | 0.0002 |
| | Na | Cu | Zn | S | Al | Ti | Mo |
| | (wt %) | (wt %) | (wt %) | (wt %) | (wt %) | (wt %) | (wt %) |
| | 0.0004 | 0.0010 | 0.0001 | 0.0073 | 0.0001 | 0.0011 | 0.0002 |
| Iron phosphate | Fe (wt %) | P (wt %) | Fe/P | D10 (μm) | D50 (μm) | D90 (μm) | (D90-D10)/D50 |
| | 36.11 | 20.52 | 0.976 | 1.73 | 6.99 | 12.96 | 1.61 |
| | BET (m²/g) | TD (g/cc) | Ni (wt %) | Co (wt %) | Mn (wt %) | Ca (wt %) | Mg (wt %) |
| | 7.60 | 1.21 | 0.0001 | 0.0009 | 0.0048 | 0.0006 | 0.0001 |
| | Na (wt %) | Cu (wt %) | Zn (wt %) | S (wt %) | Al (wt %) | Ti (wt %) | Mo (wt %) |
| | 0.0005 | 0.0001 | 0.0001 | 0.0011 | 0.0001 | 0.0013 | 0.0001 |

The basic ammonium iron phosphate prepared in Example 2 has relatively high phase purity and good particle dispersion, no other impurity phases are found. The iron phosphate after calcination has very good crystallinity, and no other impurity phases are found. The basic ammonium iron phosphate and iron phosphate have contents of iron and phosphorus as well as various other elements that meet the Chinese national standards for anhydrous iron phosphate. The iron phosphate has tap density of 1.21 g/cm³ and specific surface area of 7.60 m²/g, which is suitable as a precursor material for preparing lithium iron phosphate batteries.

Example 3

A preparation method of battery-grade iron phosphate in this example comprises steps of:

(1) Subjecting 4 kg iron phosphate waste to calcination at 300° C. for 3 hours to remove crystal water so as to obtain about 4 kg calcinated material; adding the calcainted material into a kettle containing 27 L of a 1.5 mol/L sulfuric acid solution and stirring at a rotational speed of 200 rpm, heating up the kettle to 50° C. for about 5 hours to dissolve the calcainted material, standing prior to filtering out filter residue with a precision filter and transferring the resulting filtrate to a storage tank to obtain a solution containing $Fe^{3+}$ and $PO_4^{3-}$, with an iron content of 63.42 g/L and a phosphorus content of 37.17 g/L, and a molar ratio of Fe:P of 1:1.05;

(2) With 20 L deionized water as bottom liquid, injecting the solution containing $Fe^{3+}$ and $PO_4^{3-}$ and ammonia water into a reaction kettle from a bottom at a feed rate ratio of the solution containing $Fe^{3+}$ and $PO_4^{3-}$ to ammonia water of 8:1 in parallel, finely adjusting the feed rate of ammonia water according to a pH real-time feedback system to adjust pH=1.5 so as to precipitate amorphous iron phosphate, performing reaction at 50° C. for 0.5 hour prior to solid-liquid separation, testing contents of residual Fe and P in the supernatant as 20 mg/L and 310 mg/L respectively (which indicates that Fe ions have been almost completely precipitated), and washing the reaction solution with water to a conductivity of 2500 μs/cm to obtain a yellow amorphous iron phosphate filter cake;

(3) Putting the amorphous iron phosphate filter cake into an aging kettle, thoroughly stirring the amorphous iron phosphate filter cake for 1 hour to obtain a slurry at a stirring speed of 300 rpm with a solid content of the slurry controlled to 50 g/L, heating up the aging kettle to 80° C., pumping in parallel 1.5 L orthophosphoric acid (85 wt. %) and 4 L ammonia water (25 wt. %) into the slurry in the aging kettle with a peristaltic pump, aging for 10 hours at a certain stirring speed with pH of 2.5, then subjecting the aged slurry to washing with water to a conductivity of 300 μs/cm and solid-liquid separation to obtain a basic ammonium iron phosphate $(NH_4Fe_2(OH)(PO_4)_2 \cdot 2H_2O)$ filter cake, followed by drying the filter cake at 120° C. for about 24 hours to obtain basic ammonium iron phosphate crystal powder, and testing a certain amount of ammonium iron phosphate for basic performance; and (4) Heating up the dried basic ammonium iron phosphate crystal powder in a muffle furnace to 350° C. for 4 hours at a heating rate of 5° C./min, then to 600° C. for 5 hours at a heating rate of 10° C./min, followed by naturally cooling down to room temperature to obtain 3.8 kg qualified battery-grade iron phosphate $FePO_4$ with a yield greater than 95%, and finally testing and analyzing the resulting product for phase and performance.

The physical and chemical performance indexes of basic ammonium iron phosphate and iron phosphate obtained in this example are shown in Table 3:

TABLE 3

| | Fe (wt %) | P (wt %) | Fe/P | D10 (μm) | D50 (μm) | D90 (μm) | (D90-D10)/D50 |
|---|---|---|---|---|---|---|---|
| Basic ammonium iron phosphate | 29.05 | 16.74 | 0.962 | 0.69 | 3.57 | 8.56 | 2.20 |
| | BET (m²/g) | TD (g/cc) | Ni (wt %) | Co (wt %) | Mn (wt %) | Ca (wt %) | Mg (wt %) |
| | 5.50 | 0.71 | 0.0002 | 0.0015 | 0.0042 | 0.0012 | 0.0011 |
| | Na (wt %) | Cu (wt %) | Zn (wt %) | S (wt %) | Al (wt %) | Ti (wt %) | Mo (wt %) |
| | 0.0001 | 0.0001 | 0.0021 | 0.0035 | 0.0005 | 0.0009 | 0.0002 |
| Iron phosphate | Fe (wt %) | P (wt %) | Fe/P | D10 (μm) | D50 (μm) | D90 (μm) | (D90-D10)/D50 |
| | 36.25 | 20.44 | 0.983 | 0.86 | 4.01 | 8.89 | 2.00 |

TABLE 3-continued

| BET (m²/g) | TD (g/cc) | Ni (wt %) | Co (wt %) | Mn (wt %) | Ca (wt %) | Mg (wt %) |
|---|---|---|---|---|---|---|
| 5.50 | 0.80 | 0.0001 | 0.0018 | 0.0049 | 0.0010 | 0.0009 |
| Na (wt %) | Cu (wt %) | Zn (wt %) | S (wt %) | Al (wt %) | Ti (wt %) | Mo (wt %) |
| 0.0001 | 0.0002 | 0.0024 | 0.0002 | 0.0009 | 0.0010 | 0.0002 |

The basic ammonium iron phosphate and the iron phosphate prepared in Example 3 have good crystallinity, and no other impurity phases are found. The contents of iron and phosphorus as well as various other elements meet the Chinese national standards for anhydrous iron phosphate. The iron phosphate has tap density of 0.80 g/cm³ and specific surface area of 5.50 m²/g, which is suitable as a precursor material for preparing lithium iron phosphate batteries.

The iron phosphate prepared in the aforementioned Examples 1 to 3 and the commercially available iron phosphate are prepared into lithium iron phosphate under the same conditions according to a conventional method. The prepared lithium iron phosphate is tested for compaction density and other electrical properties, and the test results are shown in Table 4 below.

TABLE 4

| | Compaction density (g/cc) | First discharge capacity at 0.1 C (mAh/g) | Specific capacity at 0.1 C after 50 cycles (mAh/g) | Cycle efficiency (%) |
|---|---|---|---|---|
| Example 1 | 2.395 | 157.8 | 153.2 | 97.08 |
| Example 2 | 2.362 | 156.9 | 152.5 | 97.20 |
| Example 3 | 2.381 | 158.3 | 153.9 | 97.22 |
| Commercially available | 2.375 | 157.5 | 153.1 | 97.21 |

The compact density and electrical properties of lithium iron phosphate powder prepared from the iron phosphate synthesized in the examples of the present disclosure are close to that of lithium iron phosphate powder prepared from commercially available iron phosphate, which indicates that the iron phosphate synthesized in the present disclosure meets the standards of battery-grade iron phosphate for lithium iron phosphate. The preparation method and application of iron phosphate provided by the present disclosure have been described in detail above. Specific examples are used herein to illustrate the principles and implementation of the present disclosure. The above description of examples is only for the purpose of helping understand methods and core concepts of the present disclosure, including best modes, and also enables any person skilled in the art to practice the present disclosure, including manufacture and use of any device or system, and implementation of any combined methods. It should be noted that several improvements and modifications can be made by those skilled in the art to the present disclosure without departing from the principles of the present disclosure, which improvements and modifications also fall within the protection scope claimed by the claims. The protection scope of the present disclosure is defined by the claims and may include other embodiments that can be thought of by those skilled in the art. If these other embodiments have structural elements that are not different from the literal expression of the claims, or if they include equivalent structural elements that are not substantially different from the literal expression of the claims, these other embodiments should also be included within the scope of the claims.

The invention claimed is:

1. A preparation method of iron phosphate, wherein the preparation method comprises steps of:

step (1): subjecting iron phosphate waste to calcination to obtain calcinated waste, dissolving the calcinated waste in an acid solution, and filtering a resulting solution to obtain filtrate, the filtrate being a solution A containing iron and phosphorus elements;

step (2): stirring a mixed solution of the solution A obtained in step (1) and a first alkali solution, adjusting pH of the mixed solution to acidity for reaction, and after washing and filtering to obtain second filter residue, the second filter residue being an amorphous yellow iron phosphate filter cake;

step (3): subjecting the yellow iron phosphate filter cake to aging, slurrying and heating, adding orthophosphoric acid and a second alkali solution thereto for reaction, followed by washing and filtering to obtain third filter residue, the third filter residue being a basic ammonium iron phosphate filter cake, then drying the basic ammonium iron phosphate filter cake to obtain basic ammonium iron phosphate crystal powder; and step (4): subjecting the basic ammonium iron phosphate crystal powder to calcination for dehydration and cooling to obtain the iron phosphate; wherein in step (3), the orthophosphoric acid has a mass concentration of 80% to 90%, and after the orthophosphoric acid is added, a molar ratio of total iron to total phosphorus in a system is 1:(1.1-1.4); a formula of the basic ammonium iron phosphate is $NH_4Fe_2(OH)(PO_4)_2 \cdot 2H_2O$, and the basic ammonium iron phosphate has D50 of 1.5 µm-10 µm, tap density of 0.70 g/cm³-1.30 g/cm³, and specific surface area of 40 m²/g-60 m²/g; and the iron phosphate has D50 of 1 µm-10 µm, tap density of 0.80 g/cm³-1.30 g/cm³, and specific surface area of 5 m²/g-10 m²/g.

2. The preparation method of claim 1, wherein in step (1), the calcination is carried out for 1 hour to 5 hours at a temperature in a range from 250° C. to 450° C.; and wherein in step (1), the dissolution is carried out for 3 hours to 10 hours at a temperature in a range from 25° C. to 60° C.

3. The preparation method of claim 1, wherein in step (1), the acid solution is one selected from a group consisting of sulfuric acid, hydrochloric acid, and orthophosphoric acid; in a case where the acid solution is sulfuric acid, the sulfuric acid has a concentration in a range from 1 mol/L to 3 mol/L; and a molar ratio of $SO_4^{2-}$ of the sulfuric acid to $Fe^{3+}$ of the iron phosphate waste is (1.3-1.8): 1.

4. The preparation method of claim 1, wherein in step (2), a dosage ratio of the solution A containing iron and phosphorus elements to the first alkali solution is (10-3): 1.

5. The preparation method of claim 1, wherein the first alkali solution in step (2) and the second alkali solution in step (3) are each independently at least one selected from a group consisting of solutions of ammonia, urea, ammonium chloride and ammonium bicarbonate; and the first alkali solution and the second alkali solution each independently have a concentration of 10 wt %-30 wt %.

6. The preparation method of claim 1, wherein in step (2), the reaction is carried out for 0.1 to 0.5 hour at a temperature in a range from 30° C. to 50° C.; and wherein in step (2), the adjusting pH of the mixed solution means that the pH of the mixed solution is adjusted to a range of 1.5-2.5.

* * * * *